(12) United States Patent
Plank et al.

(10) Patent No.: US 11,681,025 B2
(45) Date of Patent: Jun. 20, 2023

(54) SIMULTANEOUS DATA TRANSMISSION AND DEPTH IMAGE RECORDING WITH TIME-OF-FLIGHT CAMERAS

(71) Applicant: Infineon Technologies AG, Neubiberg (DE)

(72) Inventors: Hannes Plank, Graz (AT); Armin Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 1085 days.

(21) Appl. No.: 16/360,350

(22) Filed: Mar. 21, 2019

(65) Prior Publication Data

US 2020/0300986 A1 Sep. 24, 2020

(51) Int. Cl.
*G01S 7/00* (2006.01)
*G01S 7/4865* (2020.01)
(Continued)

(52) U.S. Cl.
CPC .......... *G01S 7/4865* (2013.01); *G01S 7/4863* (2013.01); *G01S 7/497* (2013.01)

(58) Field of Classification Search
USPC ...................................................... 356/5.01
See application file for complete search history.

(56) References Cited

U.S. PATENT DOCUMENTS 10,291,329 B2 * 5/2019 Steiner ............... H04B 10/5561
2005/0006577 A1 * 1/2005 Fuhrer .................. H01J 49/025
250/287

(Continued)

FOREIGN PATENT DOCUMENTS

DE 102014118893 A1 7/2015
DE 102017105142 A1 9/2018
(Continued)

OTHER PUBLICATIONS

European Search Report and Opinion for EP3,712,369 A1 (8 pages) (Year: 2020).*

(Continued)

*Primary Examiner* — James R Hulka
(74) *Attorney, Agent, or Firm* — Murphy, Bilak & Homiller, PLLC

(57) ABSTRACT

Techniques for simultaneous time-of-flight (ToF) measurement and information signal transmission. An information signal is superimposed on a series of light pulses by emitting the series of light pulses in groups of N regularly-spaced pulses and selectively varying time intervals between successive groups of pulses, such that the resulting varying time intervals between successive groups of emitted pulses are indicative of values of the information signal. Pixels configured to demodulate received light using a pulsed reference signal derived from the modulating signal are controlled to generate pixel signal values, each being indicative of a time-of-flight from the ToF measurement device to an object and back. This controlling comprises varying time intervals between successive groups of reference signal pulses in the same way time intervals between the emitted pulses are varied, so that the superimposition of the information signal has no effect on the ToF measurements.

8 Claims, 6 Drawing Sheets

(51) Int. Cl.
*G01S 7/4863* (2020.01)
*G01S 7/497* (2006.01)

(56) References Cited

U.S. PATENT DOCUMENTS

| | | | |
|---|---|---|---|
| 2013/0050676 A1* | 2/2013 | d'Aligny | G01S 7/484 |
| | | | 356/5.01 |
| 2015/0180581 A1* | 6/2015 | Steiner | G01S 17/87 |
| | | | 398/188 |
| 2018/0259628 A1 | 9/2018 | Plank et al. | |
| 2020/0072977 A1* | 3/2020 | Shoji | G01S 17/26 |

FOREIGN PATENT DOCUMENTS

| | | | | |
|---|---|---|---|---|
| EP | 3617743 A1 | 3/2020 | | |
| JP | 2020034438 A | * | 3/2020 | G01S 17/102 |

OTHER PUBLICATIONS

English Machine Translation of EP 3,617,743 A1 (same Family as JP 2020-034438 and US-2020/0072977) (Year: 2019).*
English Machine Translation of DE 10-2017-105142 B4 (11 pages) (Year: 2017).*
English Machine Translation of DE 10-2014-118893 A1 (7 pages) (Year: 2014).*

* cited by examiner ary time intervals between successive groups of reference signal pulses in the same way time intervals between the emitted pulses are varied, so that the superimposition of data has no effect on the ToF measurements.

SIMULTANEOUS DATA TRANSMISSION AND DEPTH IMAGE RECORDING WITH TIME-OF-FLIGHT CAMERAS

TECHNICAL FIELD

The present disclosure is generally related to time-of-flight (ToF) measurements and is more particularly related to techniques for superimposing data on emitted light used for ToF measurements.

BACKGROUND

In optical sensing applications, depth measurements, i.e., measurements of the distance to various features of an object or objects in view of an image sensor may be performed as so-called time-of-flight (ToF) measurements, which are distance measurements determined using the speed of light and image/pixel sensors. The distance to an object of interest is typically calculated per pixel and, once calculated, can be used for depth detection, gesture identification, object detection, and the like. The distance per pixel is combined to create an output, such as a depth map that provides a three-dimensional image. Other types of output, such as pointclouds, intensity images, etc., may be produced instead of or in addition to a depth map. ToF measurement technology is increasingly being found in portable electronic devices, such as cellular phones and "smart" devices.

Many conventional approaches to TOF measurements require multiple sequential exposures, also referred to as copies. Each exposure requires that light generated from a light source be amplitude modulated using a modulating signal at a respective phase with respect to a reference signal applied to the pixels that demodulate light reflected from an object or objects of interest, the phase being different for different exposures. For example, one approach requires four separate exposures, with the phase of the modulating signal at 0°, 90°, 180° and 270°, respectively, with respect to the reference signal. Measurement information from the four exposures is collected and compared to determine a depth map. For high-precision measurements, with extended unambiguous ranges, even more exposures, e.g., as many as nine separate raw measurements, may be performed. This conventional approach, as well as several variants and supporting hardware, are described in detail in co-pending U.S. patent application Ser. No. 16/176,817, titled "Image Sensor with Interleaved Hold for Single-Readout Depth Measurement," filed 31 Oct. 2018, the entire contents of which are incorporated herein by reference, for the purpose of supplying background to the present disclosure.

SUMMARY

Techniques for simultaneous time-of-flight (ToF) measurement and data transmission are described herein. According to some of the embodiments described below, data is superimposed on a series of light pulses formed by amplitude-modulating light with a modulating signal having a frequency f, by emitting the series of light pulses in groups of N regularly-spaced pulses and selectively varying time intervals between successive groups of pulses, such that the resulting varying time intervals between successive groups of emitted pulses are indicative of transmitted data values. Pixels configured to demodulate received light using a pulsed reference signal derived from the modulating signal are controlled to generate pixel signal values, each being indicative of a time-of-flight from the ToF measurement device to an object and back. This controlling comprises varying time intervals between successive groups of reference signal pulses in the same way time intervals between the emitted pulses are varied, so that the superimposition of data has no effect on the ToF measurements.

DETAILED DESCRIPTION

Figure 1:
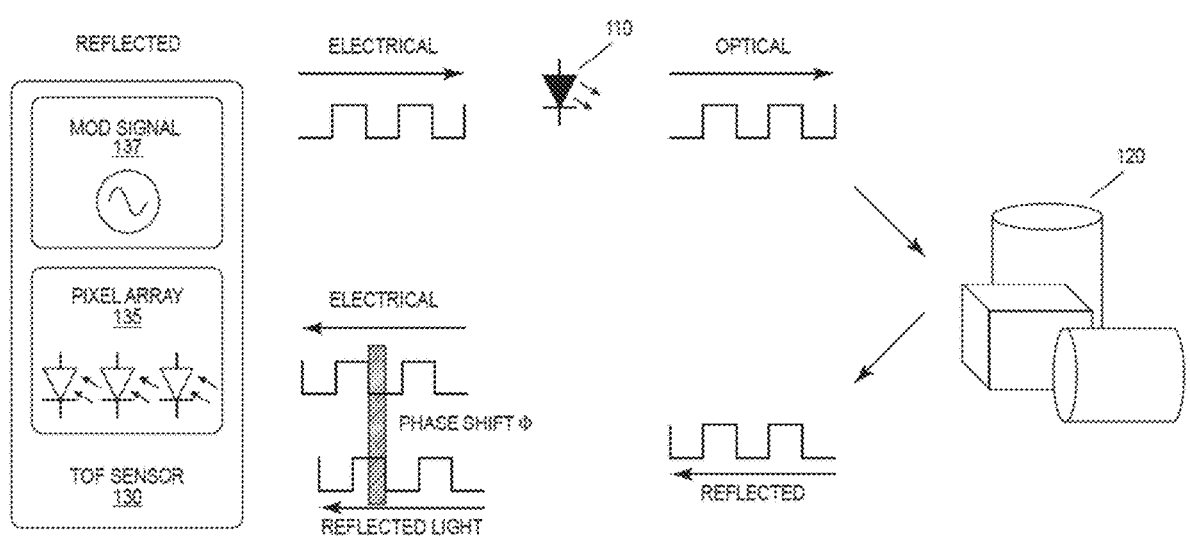
FIG. 1 is a diagram illustrating a system for time of flight measurement according to some of the embodiments described herein.

As discussed briefly above, time-of-flight (ToF) measurement devices emit modulated light, for the purposes of measuring distances to nearby objects and scenes. Modulated light can also be used for communication purposes. Combining optical communications with ToF depth sensing can provide any of a number of benefits to the communications, such as location-aware communication, for example, where communication is combined with localization, and/or for short-range, secured communication that is resilient to relay-attacks. Location-aware optical communications between portable devices can benefit from ToF depth sensing, where the depth information indicates the distance to the communication partner and the position of the partner device in the image indicates the direction.

However, transmitting data optically takes energy, which may be of limited availability on some devices. Further, the amount and intensity of light emitted by a transmitting data may be severely restricted by regulations, e.g., for eye safety reasons. Thus, it can be important to reduce the amount of light energy needed to carry out desired communication and depth-sensing functions.

Described herein are techniques for combining depth sensing and data transmission. This means that data is transmitted to other devices on the same modulated light that used for ToF measurements. In other words, data can be superimposed on modulated light that is used for ToF measurements, e.g., for depth imaging.

The present invention will now be described with reference to the attached drawing figures, wherein like reference numerals are used to refer to like elements throughout, and wherein the illustrated structures and devices are not necessarily drawn to scale. In this disclosure, the terms "image" and "image sensor" are not limited to images or sensors involving visible light but encompass the use of visible light and other electromagnetic radiation. Thus, the term "light" as used herein is meant broadly and refers to visible light as well as infrared and ultraviolet radiation.

FIG. 1 illustrates the basic principles of continuous-wave (CW) time-of-flight (TOF) measurements, which are well known. A light source 110, such as a light-emitting diode (LED) or vertical-cavity surface-emitting laser (VCSEL), is modulated with an electrical signal (e.g., a radio-frequency sinusoid at, for example, 300 MHz), so that the light source 110 emits an amplitude-modulated optical signal towards the target scene 120. Traveling at the speed of light c, the light signal reflects from an object or objects in the scene 120 and arrives back at a pixel array 135 in the TOF sensor 130, with the time of flight to the target scene 120 and back imposing a phase shift of Ø on the optical signal as received at the pixel array 135, relative to the originally transmitted optical signal.

The modulation signal 137 used to modulate the emitted light, or a phase-shifted version of it, is also supplied as a reference signal to the pixels in pixel array 135, to be correlated with the modulation signal superimposed on the reflected optical signal—in effect, the reflected optical signal is demodulated by each pixel in the pixel array 135.

Figure 2:
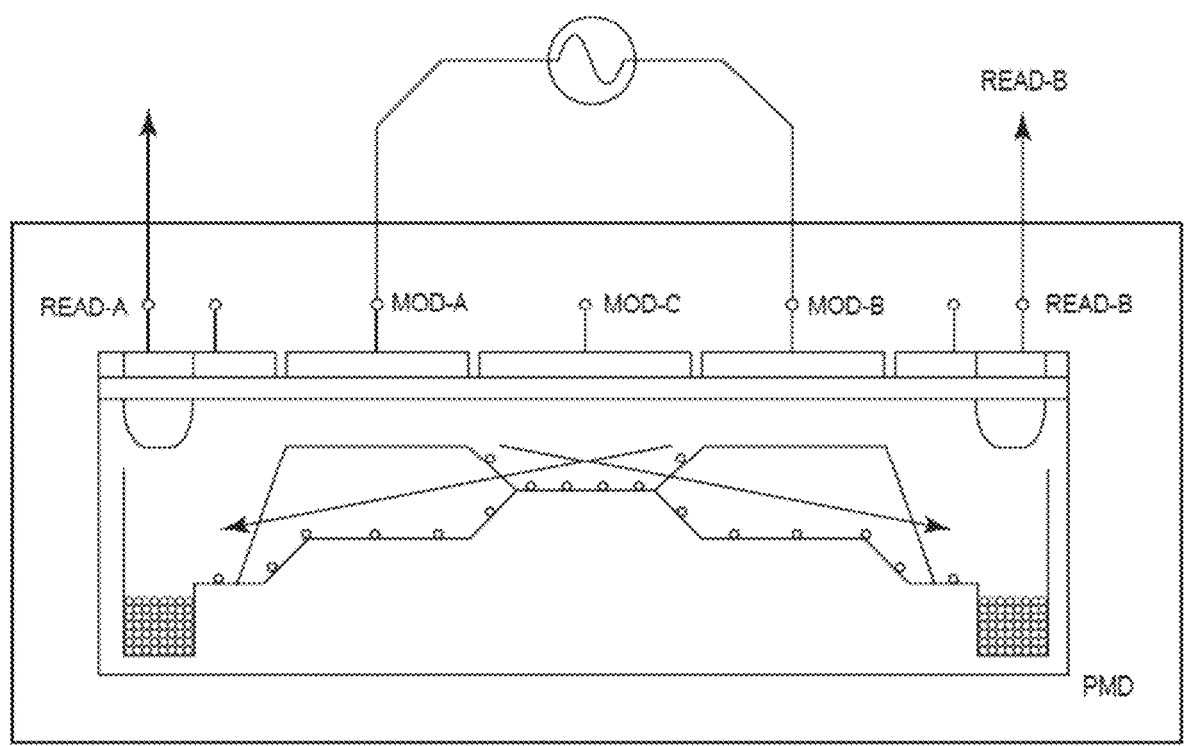
FIG. 2 illustrates an example photonic mixing device (PMD).

While the structure and design of light-sensing pixels may vary, each of the pixels in pixel array 135 may in some instances be a photon mixing device, or PMD. FIG. 2 illustrates the basic structure of an example PMD, which includes readout diodes A and B and modulation gates A and B. A reference signal is applied differentially across the modulation gates A and B, creating a gradient in electric potential across the p-substrate, while incoming light is received at a photo gate/diode. A differential sensor signal is generated across the readout diodes A and B. The sensor signal from a pixel may be integrated for a period of time to determine phase measurement information.

The difference between voltages at the Read-A and Read-B nodes of the PMD corresponds to the correlation between the modulated optical signal detected by the photosensitive diode structures in the illustrated device and the reference signal, which is applied between the Mod-A and Mod-B nodes of the device. Thus, the PMD (and other light-sensitive pixel structures) demodulate the modulated optical signal reflected from the target scene 120, producing a pixel signal value (in this case the difference between voltages at Read-A and Read-B) indicative of the distance traveled by the reflected optical signal, as discussed in further detail below.

While the modulation signal may take any of a variety of forms, the principle behind this correlation/demodulation is most easily seen with a sinusoidal signal as a modulation signal. If the modulation signal g(t) and the received signal s(t) with modulation amplitude 'a' and phase shift 'Ø' are given as:

$$m(t) = \cos(\omega t), \text{ and}$$

$$s(t) = 1 + (a \times \cos(\omega t + \emptyset)),$$

then the correlation of the received signal with the reference signal gives:

$$r(\tau) = \left(\frac{a}{2}\right) \cos(\emptyset + w\tau),$$

which is a function of the phase difference Ø between the two signals. It will be appreciated that with a periodic modulation signal, this correlation can be carried out for an extended period of time, e.g., several cycles of the modulating signal, to improve the signal-to-noise ratio of the resulting measurement.

Figure 3:
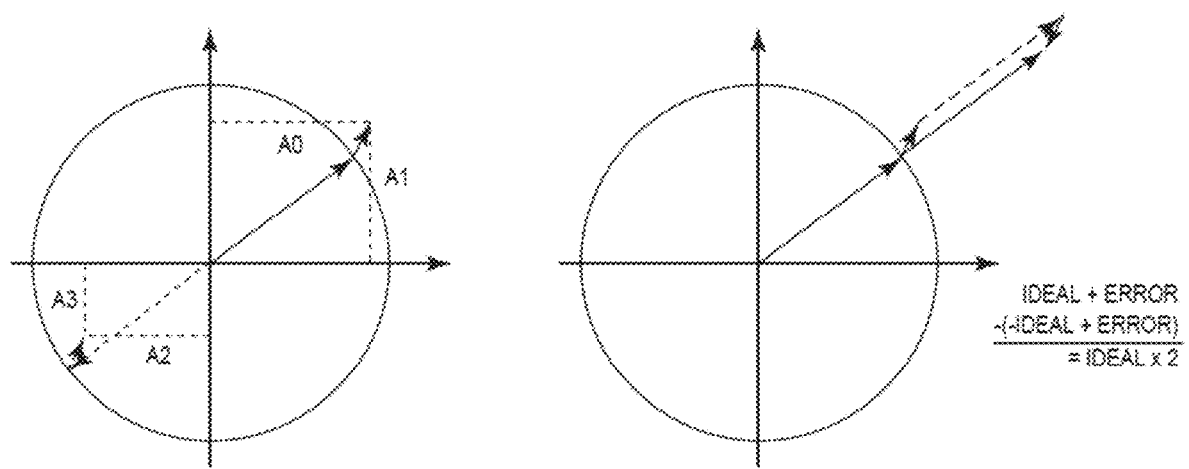
FIG. 3 is a diagram illustrating principles of phase measurement according to time-of-flight (TOF) techniques.

The phase difference between the emitted optical signal and the received reflection of that signal, which is proportional to the distance traveled by the optical signal, can be extracted by an N-phase shifting technique. This requires sampling the correlation function at N different points, e.g., by performing correlations using N different phase shifts of the reference signal, with respect to the modulating signal g(t). At least two measurements are required to calculate this phase shift, and hence to determine the distance traveled. This is often done using four different phase shifts, at 0, 90, 180, and 270 degrees, as this allows for a simple cancellation of systematic offsets in the correlation results. This is seen in FIG. 3, which shows how the correlations A0 and A1, at 0 and 90 degrees, respectively, correspond to a first phase vector having an "ideal" component corresponding to the actual difference traveled by the optical signal and a systematic component reflecting systematic error in the measurements and readout. Likewise, the correlations A2 and A3, at 180 and 270 degrees, respectively, correspond to a second phase vector pointing in the opposite direction, with an exactly opposite "ideal" component and an identical systematic component. In the figure, the ideal components are represented by the vectors extending from the origin to the circle, while the systematic error components are represented by the smaller vectors. The actual phase Ø can then be calculated as follows:

$$\emptyset = \arctan\left(\frac{A1 - A3}{A2 - A0}\right).$$

From this phase, the distance, or "depth" to the target scene 120 can be calculated as follows:

$$D = \frac{c \times \emptyset}{4\pi f_{mod}},$$

where $f_{mod}$ is the frequency of the modulating signal. It will be appreciated that because of "phase wrapping," this distance calculation has an ambiguous result, as it is not possible to tell from a single distance calculation whether the distance traveled is less than a single wavelength of the modulating waveform, or multiple wavelengths. Various techniques for resolving this ambiguity are well known, e.g., by incorporating amplitude information obtained from the reflected optical signal, and/or repeating the measurement with a different modulating frequency, but a detailed discussion of these techniques is unnecessary to a full understanding of the presently disclosed techniques and is thus beyond the scope of the present disclosure.

Figure 4A:
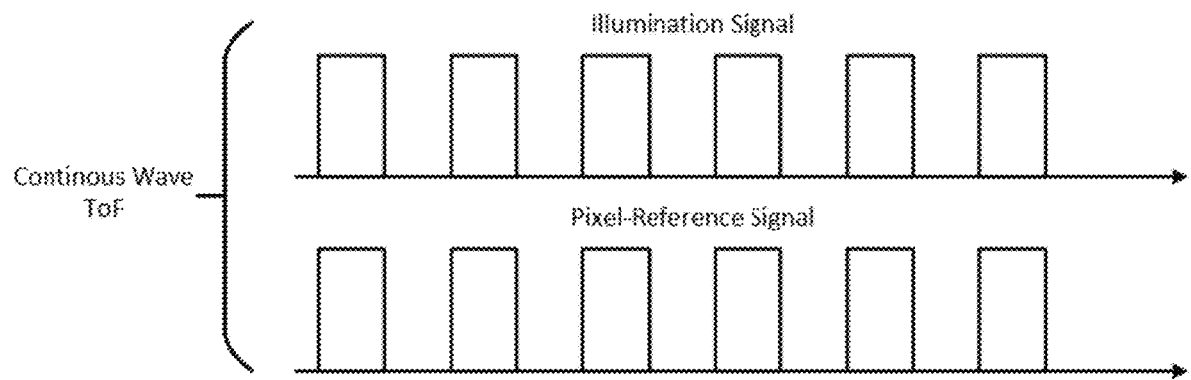
FIGS. 4A and 4B illustrate principles of combined ToF measurements and data transmission, according to some embodiments.
Figure 4B:
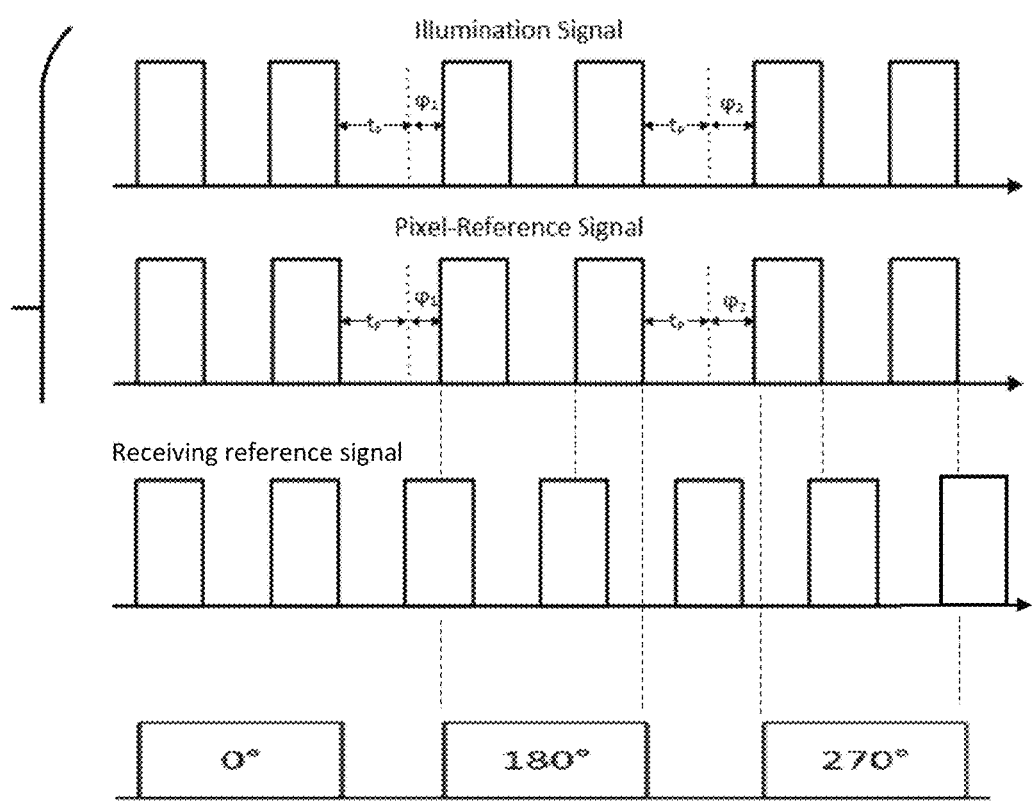

FIGS. 4A and 4B illustrate the principles underlying one example technique for superimposing data transmission on the modulated light used for ToF measurements. FIG. 4A shows the relationship between the emitted illumination signal and the reference signal applied to the demodulating pixels for a conventional continuous-wave ToF measurement using rectangular pulses for intensity-modulation of the emitted light. As can be seen in the figure, a given exposure may involve the transmission of a series of regularly spaced pulses, shown in FIG. 4A as the "illumination signal." For an exposure where the phase difference between the illumination signal and the reference signal is zero, as shown in the figure, the reference signal applied to the pixels may be effectively identical to the amplitude modulation applied to the emitted light. In FIG. 4A, this is seen in "pixel reference signal," which comprises a series of regularly spaced pulses aligned with the illumination signal. An exposure might have a duration of one or more milliseconds, for example—with a reference frequency of 100 MHz, this means that the exposure may include hundreds of pulses. The ToF measurement device correlates light pulses reflected from an object with the reference signal, integrating the correlations over these pulses to produce a phase measurement that is proportional to the distance to the object or scene of interest. It will be appreciated that when the pulses are rectangular, as shown in FIG. 4A, this measurement is effectively a measurement of the alignment between the received light pulses and the reference signal, with increasing distance to the illuminated object (within the ambiguity distance) manifesting itself as increased misalignment between the received light pulses and the reference pulses.

As noted above, a given exposure may comprise a series of dozens or hundreds of regularly spaced pulses, with FIG. 4A showing only a small portion of those pulses. Data can be superimposed on the emitted light by grouping the pulses into groups of N pulses, with each group being transmitted with regular spacing between the N pulses. In other words, the time interval between pulses within a given group is constant. However, the spacing (i.e., time interval) between successive groups may be varied, with the degree of that variation conveying information. An example of this is shown in FIG. 4B, which illustrates an example where N=2, i.e., where there are two pulses per group in the illumination signal. As seen in the figure, the time interval between the pulses within a given group is constant, across all of the groups, and is equal to $t_p$. The time interval between successive groups, however, may vary from this "normal" time interval $t_p$, with this variation conveying information. In the example shown in FIG. 4A, the second group of pulses is delayed, with respect to the first group, by an additional time $\varphi_1$. The third group is delayed, with respect to the second group, by a different additional time $\varphi_2$.

These different time delays may convey data values to a remote receiver that is able to detect these delays, e.g., where a delay of $t_p+\varphi_1$ indicates a value of "0," while a delay of $t_p+\varphi_2$ indicates a value of "1." Note that this is simply an illustrative example—some embodiments may utilize additional delays, so as to provide a more complex modulation alphabet, e.g., so that each delay carries more than one bit value. For example, if four different delays between groups are utilized, each delay can indicate one of four possible combinations of two bits. Even more complex modulation alphabets are possible.

More generally, at least three basic approaches to conveying data via these time delays are possible, with these corresponding generally to on-off keying, pulse-position modulation, and phase-shift keying. According to the on-off keying approach, the presence or absence of an extra delay between adjacent groups of pulses conveys a "1" or "0." In the pulse-position modulation approach, information is carried by the specific length of the delay between adjacent groups of pulses, which can be very long relative to the spacing between pulses within each group—this information can represent an analog quantity or one of a predetermined number of quantized levels. With phase-shift keying, which is the approach illustrated in FIG. 4B, the variability in the delay is a fraction of the interval from pulse to pulse within a given group, such that the phase of a group of pulses, relative to the prior group, carries information. As a general matter, this can be representative of an analog quantity, or one of a predetermined number of quantized levels. The phase-shift keying approach allows for straightforward demodulation of the information using a ToF sensor (e.g., with PMD pixels) in the receiving device, as is described in detail below.

Importantly, when the data is being transmitted simultaneously with the performing of ToF measurements, the transmitting device's reference signal, which is applied to the pixels demodulating the light signal reflected from an object or objects of interest, is adjusted in a manner that directly corresponds to the timing adjustments made to the emitted light pulses. Thus, each time a delay between two successive groups of N pulses is adjusted in the train of emitted light pulses, to convey a data value, the very same adjustment is made to the reference signal. This is shown in FIG. 4B. The consequence of this is that these adjustments to the spacings between groups of emitted light pulses is invisible to, i.e., has no effect on, the correlation process carried out by the pixels performing the ToF measurement, as the phase/timing relationship between each received pulsed reflected from an object of interest and its corresponding reference pulse remains the same.

A separate receiving device, however, may be configured to detect the variations in delay between successive groups of N pulses, and to thus detect the data carried by the emitted train of light pulses. Notably, this may be done using one or more PMDs and a receiving reference signal that is synchronized to the fundamental modulating signal used by the transmitting device. For example, a clock in a receiving device may be first synchronized to a train of regularly-spaced pulses received from the transmitting device, and used to generate a produce a corresponding periodic receiving reference signal with pulses of width of $t_p$. Then, the timing of each group of N pulses received from the transmitting device may be compared to this receiving reference signal, using one or more PMDs. This is effectively a phase measurement, like those conventionally performed in a ToF sensor, but with a correlation length that extends over only N pulses, so that one phase measurement is produced for each group of N pulses. If this is done with the emitted pulses shown in FIG. 4B, the first group of N pulses will yield a phase measurement of 0 degrees, as the first group of N pulses will be aligned with the receiving reference signal that is generated in the receiving device by synchronizing to a regular train of pulses from the transmitting device. The second group of N pulses, however, will result in a measurement of 180 degrees, as these pulses will be offset by one-half the pulse width $t_p$ from the receiving reference signal. This difference of 180 degrees from the previous group may be interpreted as a "0," for example, or some other data value. Similarly, the third group of N pulses will result in a measurement of 90 degrees, as these pulses will be offset by one-quarter of a pulse width $t_p$ from the reference signal used by the receiving device; the difference between this measurement and the preceding one, which is 270 degrees, can be interpreted as a second data value, e.g., a "1."

As can be seen in the example approach illustrated in FIGS. 4A and 4B, after the transmission of each group of N pulses, there is a delay of $t_p$, in addition to the phase delay $\varphi_1$ or $\varphi_2$. This pause allows the emitted pulses to travel back from an illuminated object to the sensor. For short-range ToF, which may use, for example, only 4 phase measurements, $t_p$ can simply be T/2, where T is the period of the modulation signal. For long-range ToF, however, e.g., where 8 phase measurements are used, $t_p$ may be extended, so as to cover the maximum elapsed travel time of the light from the camera to the scene and back (time-of-flight).

It will be appreciated that the introduction of the phase delays φ prolongs the exposure time. If data is superimposed on only a relatively small portion of the emitted pulses, this effect may be very small. Further, it will be appreciated that while the overall exposure time is lengthened, the energy emitted remains the same, as it is the delays between emitted pulses that are lengthened.

In the approach described immediately above, the receiving device aligns to a regularly-spaced pulse train so that it can detect the phase value conveyed by each group of pulses. In a different approach, two groups of pulses are used to convey each phase value, with the second group being shifted by a known phase, such as 90 degrees, relative to the first group. With this approach, the demodulating device can obtain two samples per transmitted symbol (one sample for each of the two groups). With this approach, a phase value indicative of the delay between the pair of groups of pulses and the preceding pair of groups of pulses can be computed directly from the two samples.

In some embodiments, as indicated above, a clock at the receiving device may be synchronized with a corresponding clock at the transmitting device, so that a receiving reference signal can be generated. This can be facilitated by having the transmitting device transmit a series of pulses that do not have modulation superimposed on them, before superimposing data on subsequent pulses, so that the receiving device can detect the timing of the unmodulated pulse train and generate a receiving reference signal for detecting the subsequently transmitted data. Example techniques for synchronizing a receiving ToF measurement device to an externally generated light signal are described in U.S. Patent Application Publication No. US 2018/0259628 A1, the entire contents of which are incorporated herein by reference. It will be appreciated that other techniques for synchronizing to the transmitting device and generating a reference for detecting the transmitted data may be used, however. It will also be appreciated that while the receiving device may detect the transmitted data using PMDs or other pixel sensors, as described above, receiving devices may alternatively use any of a variety of photodetector devices for carrying out the detection of data from the received optical signal. Thus, while the techniques described herein may be used to transmit from one ToF measurement device to another, with each using their respective ToF sensors for their respective transmit and receive functions, the techniques described herein may also be used for transmitting from a ToF measurement to another device that comprises only an optical receiver.

In view of the techniques described above, it will be appreciated that FIG. 5 is a process flow diagram illustrating an example method, in a ToF measurement device, for communicating an information signal, which may be an analog or digital signal, via ToF measurement pulses. As shown at block 510, the method includes the step of emitting a series of light pulses formed by amplitude-modulating light with a modulating signal, where emitting the series of light pulses comprises superimposing the information signal on the series of light pulses by emitting the series of light pulses in groups of N pulses, the N pulses in each group of emitted pulses being emitted at regular intervals, and selectively varying time intervals between successive groups of emitted pulses in response to the information signal, such that the resulting varying time intervals between successive groups of emitted pulses are indicative of values of the information signal. A frequency f of the modulation signal may be selected, in some embodiments, to provide a desired unambiguous measurement range, in some embodiments.

For example, f may be about 100 MHz, in some embodiments, to provide an unambiguous measurement range of about 1.5 meters. N may be a relatively small number, in some embodiments, such as 2-10, or larger, e.g., 10-100, in others, so as to provide for greater signal to noise in the receiving device.

As shown at block 520, the method also includes the step of controlling one or more pixels configured to demodulate received light using a pulsed reference signal derived from the modulating signal, to generate respective pixel signal values, each of one or more of the pixel signal values being indicative of a time-of-flight from the ToF measurement device to an object and back to the ToF measurement device. This controlling comprises varying time intervals between successive groups of reference signal pulses in correspondence to said varying of time intervals between the successive groups of emitted pulses; as discussed above, this effectively makes the varying time intervals between the groups of emitted light pulses invisible to the ToF sensor in the transmitting device. It will be appreciated that this controlling step shown in block 520 is carried out essentially simultaneously with the step of emitting the series of light pulses illustrated in block 510.

Figure 5:
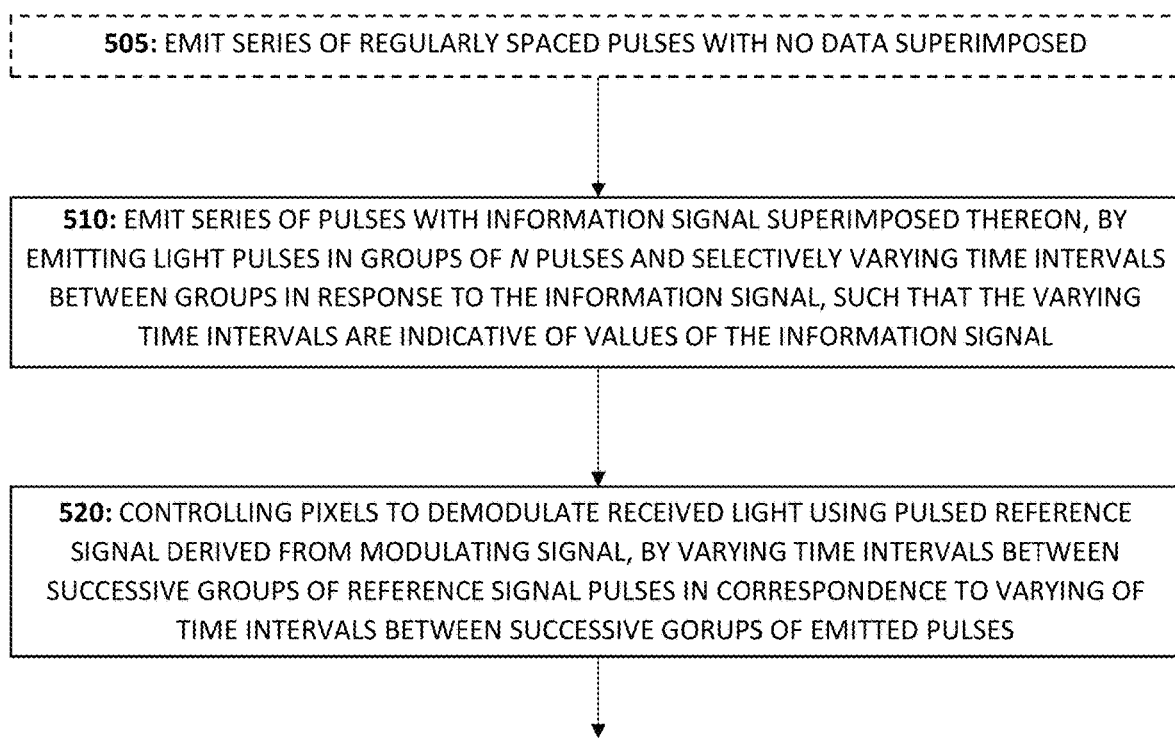
FIG. 5 is a flow diagram illustrating a method for communicating data via ToF measurement pulses, according to some embodiments.

In some embodiments, the steps shown in blocks 510 and 520 are preceded by a step of emitting a series of regularly-spaced pulses with no information signal superimposed on them, so as to provide a synchronization signal for a receiving device, so that the receiving device can adjust a receiving reference signal for use in detecting the subsequently transmitted data. In some embodiments, this step of emitting a series of pulses with no data superimposed on them may be repeated from time to time, to allow the receiving device to update its synchronization. In FIG. 5, this is shown at block 505, where this step is illustrated with a dashed outline to indicate that it need not be present in all embodiments or in all instances, since, for example, synchronization may be achieved by other means and/or carried over from an earlier transmission, in some embodiments.

In some embodiments, the information signal is an analog signal, and the varying intervals convey values of the analog information signal. In other embodiments, the information signal is a digital signal, and the intervals between successive groups of the emitted pulses are restricted to a predetermined set of varying time intervals. This set may comprise just two varying time intervals, for example, such that a single bit is conveyed with each variation. The set may comprise more than two varying intervals in other embodiments, such that each variation conveys more than a single bit of information. In some embodiments, the varying time intervals between successive groups of the emitted pulses vary from the length of the regular intervals by no more than the length of the regular intervals.

In some embodiments, the time interval between each group of the emitted pulses and the immediately following group indicates a value of the information signal, where that value may be an analog or digital value. In other embodiments, the pulses are emitted in pairs of groups of N pulses, with the second group of N pulses in each pair being shifted by a fixed phase, such as 90 degrees, relative to the first group of N pulses. As discussed above, this latter approach allows for a phase value to be computed directly from each pair of groups of N pulses, without regard to alignment between the received pulses and a reference clock.

As discussed above, another ToF measurement device, e.g., a camera, such as in a cellphone, can receive the signal and detect the data superimposed on the light pulses. This can be used to detect the presence of other cameras, for example. In some embodiments, each ToF measurement device can use the techniques described above to transmit a unique ID. Other ToF measurement devices receiving the signal can detect and identify other cameras. This enables, for example, a smartphone equipped with such a ToF measurement device to detect other similarly-equipped smartphones. This information could be used to determine which devices are used into the same environment, creating a network of deployed devices. A connection of two ToF cameras on smartphones can be used to pair the devices, e.g., for a common Bluetooth connection.

The emitted signal can also be decoded by an electronic circuit, using a photodiode as receiver.

Figure 6:
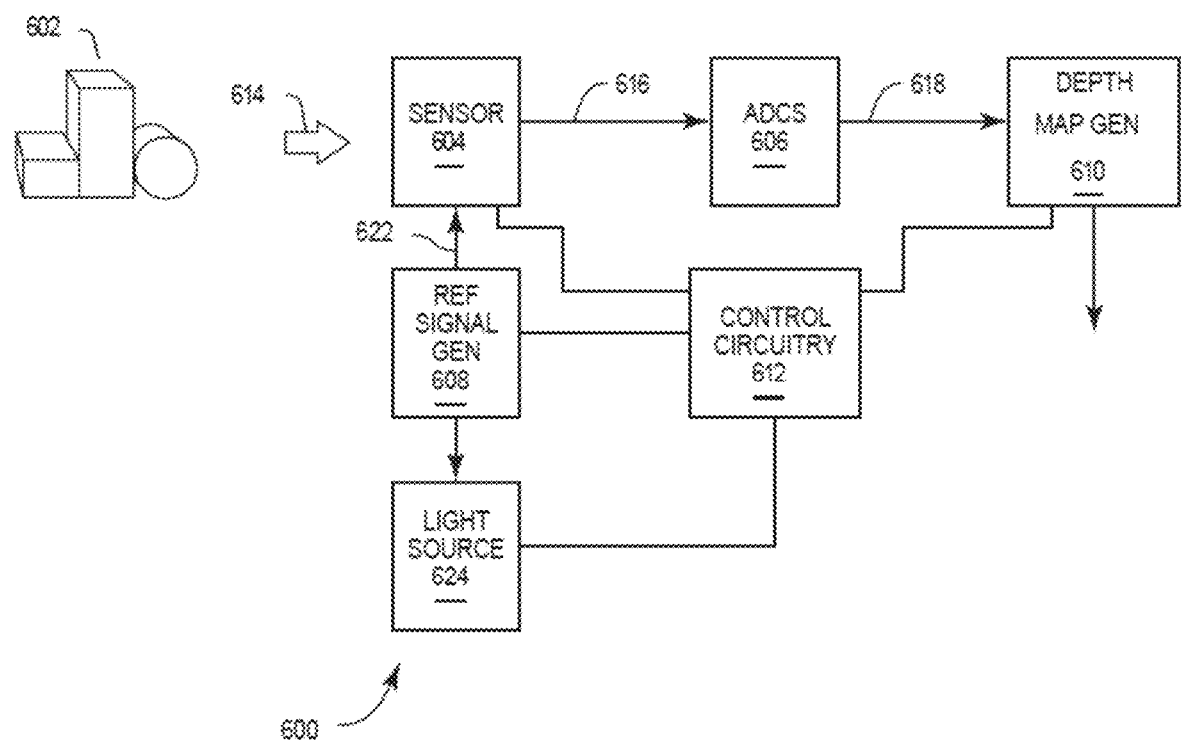
FIG. 6 is a block diagram illustrating components of an example ToF measurement device, according to some embodiments.

FIG. 6 illustrates an example ToF measurement device 600, according to several embodiments of the presently disclosed devices and systems. The ToF measurement device 600 can be utilized to detect objects, e.g., as shown in target scene 602, as well as to determine distances to the detected objects. ToF measurement device 600 may be a continuous-wave TOF system, such as a photon modulation device (PMD)-based TOF system. ToF measurement device 600 may be further configured to superimpose an information signal on emitted light pulses, according to the techniques described herein, for reception by a remote device.

The illustrated ToF measurement device 600 includes a light source 624, which is configured to amplitude modulate a beam of light with a modulating signal and emit the amplitude-modulated light towards the scene 602. The amplitude modulation may be based on a reference signal generated by reference signal generator 608. The reference signal may be a radio-frequency (RF) signal, e.g., in the MHz range, although other modulation frequencies can be used. The emitted light can include light having varied ranges of wavelength, such as sunlight and infra-red. The emitted light reflects from one or more objects in the scene and returns to the sensor 604.

The illustrated ToF measurement device 600 further includes a sensor 604, which comprises a plurality of pixels configured to generate a respective plurality of pixel signal values in response to received light 614, where each pixel is configured to obtain its respective pixel signal value by demodulating received light using a reference signal 622. As seen in FIG. 6, received light 602 may be reflected from a target scene 602. As discussed above, while several suitable pixel configurations are possible, one suitable pixel design is the PMD described above.

The numbers of pixels, rows, and columns can vary, from one embodiment to another, and are selected based on factors including desired resolution, intensity, and the like. In one example, these sensor characteristics are selected based on the objects to be detected and the expected distances to the objects. Thus, for example, the pixel resolution of the pixels in sensor 604 may vary, from one embodiment to another. Small objects require a higher resolution for detection. For example, finger detection requires a resolution of <5 mm per pixel at a distance or range of about 0.5 meters. Medium sized objects, such as hand detection, require a resolution of <20 mm per pixel at a range of about 1.5 meters. Larger sized objects, such as a human body, require a resolution of <60 mm per pixel at about 2.5 meters. It is appreciated that the above examples are provided for illustrative purposes only and that variations can occur including other objects, resolutions and distances for detection. Some examples of suitable resolutions include VGA—640×400 pixels, CIF—352×288 pixels, QQ-VGA—160×120 pixels, and the like.

ToF measurement device 600 further includes a reference signal generator 608, which may be configured, in some embodiments, to generate reference signal 622 with a selectable phase, relative to the phase of a modulation signal applied to light transmitted towards target scene 602, and to provide the reference signal 622 to the plurality of pixels in sensor 604. Image processing system 600 still further includes an analog-to-digital converter (ADC) circuit 606, which may include one or several ADCs, operatively coupled to the plurality of pixels in sensor 604, with ADC circuit 606 providing digital phase or distance measurements to depth map generator 610. Note that depth map generator 610 may, in various embodiments, be configured to produce a pointcloud or other representation or combination of depth data, in addition to or instead of a depth map.

The illustrated ToF measurement device 600 further includes control circuitry 612, which may comprise, for example a processor, controller, or the like, and/or other digital logic. In several embodiments, the control circuitry 612 is configured to cause the image processing system 600 to carry out a method like those described above, in connection with FIG. 5. Thus, for example, control circuitry 612 may be configured to control the light source 624 to emit the series of light pulses in groups of N pulses, the N pulses in each group of emitted pulses being emitted at regular intervals, and to selectively vary time intervals between successive groups of emitted pulses in response to an information signal, such that the resulting varying time intervals between successive groups of emitted pulses are indicative of the information signal. Control circuitry 612 may be further configured to control one or more of the pixels in sensor 604 to demodulate received light using a pulsed reference signal derived from the modulating signal, to generate respective pixel signal values, each of one or more of the pixel signal values being indicative of a time-of-flight from the ToF measurement device to an object and back to the ToF measurement device. Control circuitry 612 may be still further configured to control the reference signal generator 608 to vary time intervals between successive groups of reference signal pulses in correspondence to said varying of time intervals between the successive groups of emitted pulses, so that the varying of time intervals between successive groups of emitted pulses has no effect on the phase measurements performed with sensor 604. In various embodiments, the control circuitry 612 may be configured to carry out any of the variations of this technique that were described above, in connection with the method illustrated in FIG. 5.

In view of the detailed discussion above, it will be appreciated that the inventive subject matter described herein may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method, by a time-of-flight (ToF) measurement device, for communicating data via ToF measurement pulses, the method comprising:

emitting a series of light pulses formed by amplitude-modulating light with a modulating signal, wherein emitting the series of light pulses comprises superimposing an analog information signal on the series of light pulses by emitting the series of light pulses in groups of N pulses, the N pulses in each group of emitted pulses being emitted at regular intervals, and selectively varying time intervals between successive groups of emitted pulses in response to the analog information signal, such that the resulting varying time intervals between successive groups of emitted pulses are indicative of values of the analog information signal; and controlling one or more pixels configured to demodulate received light using a pulsed reference signal derived from the modulating signal, to generate respective pixel signal values, each of one or more of the pixel signal values being indicative of a time-of-flight from the ToF measurement device to an object and back to the ToF measurement device, wherein said controlling comprises varying time intervals between successive groups of reference signal pulses in correspondence to said varying of time intervals between the successive groups of emitted pulses.

2. The method of claim 1, wherein said emitting and said controlling are preceded by emitting a series of regularly-spaced pulses with no analog information signal superimposed thereon.

3. The method of claim 1, wherein the varying time intervals between successive groups of the emitted pulses vary from the length of the regular intervals by no more than the length of the regular intervals.

4. The method of claim 1, wherein the time interval between each group of the emitted pulses and the immediately following group indicates a value of the analog information signal.

5. A time-of-flight measurement device, comprising:

a light source configured to emit a series of light pulses formed by amplitude-modulating light with a modulating signal;

a sensor comprising a plurality of pixels configured to generate a respective plurality of pixel signal values in response to received light, wherein each pixel is configured to obtain its respective pixel signal value by demodulating received light using a reference signal;

a reference signal generator configured to generate the reference signal and to provide the reference signal to the plurality of pixels, and control circuitry configured to:

control the light source to emit the series of light pulses in groups of N pulses, the N pulses in each group of emitted pulses being emitted at regular intervals, and to selectively vary time intervals between successive groups of emitted pulses in response to an analog information signal, such that the resulting varying time intervals between successive groups of emitted pulses are indicative of values of the analog information signal;

control one or more of the pixels to demodulate received light using the reference signal, to generate respective pixel signal values, each of one or more of the pixel signal values being indicative of a time-of-flight from the ToF measurement device to an object and back to the ToF measurement device, control the reference signal generator to vary time intervals between successive groups of reference signal pulses in correspondence to said varying of time intervals between the successive groups of emitted pulses.

6. The time-of-flight measurement device of claim 5, wherein the control circuit is further configured to control the optical transmitter to emit a series of regularly spaced pulses with no analog information signal superimposed thereon, prior to emitting the pulses in groups of N pulses with varying time intervals between successive groups.

7. The time-of-flight measurement device of claim 5, wherein the control circuitry is configured to emit the series of light pulses so that the varying time intervals between successive groups of the emitted pulses vary from the length of the regular intervals by no more than the length of the regular intervals.

8. The time-of-flight measurement device of claim 5, wherein the control circuitry is configured to emit the series of light pulses so that the time interval between each group of the emitted pulses and the immediately following group indicates a value of the information signal.

* * * * *